April 15, 1952            J. J. BLACK            2,592,647
LOCKING MECHANISM FOR VEHICLE DOORS
Filed June 8, 1945            2 SHEETS—SHEET 1
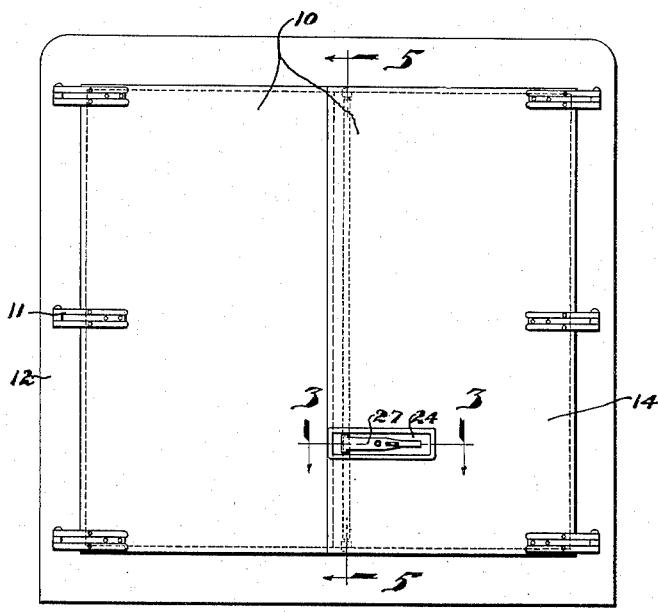
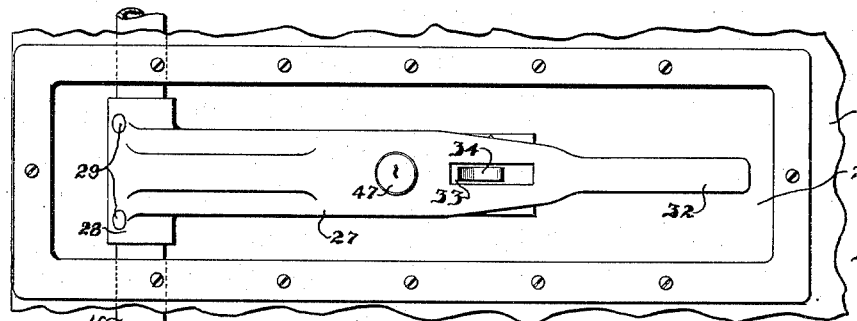
INVENTOR.
James J. Black
BY Wood, Arey, Herron & Evans
Attorneys.

April 15, 1952     J. J. BLACK     2,592,647
LOCKING MECHANISM FOR VEHICLE DOORS
Filed June 8, 1945     2 SHEETS—SHEET 2
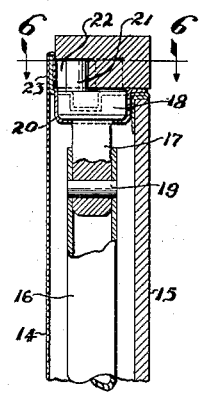
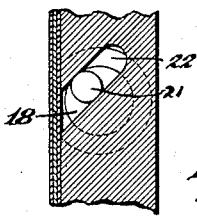
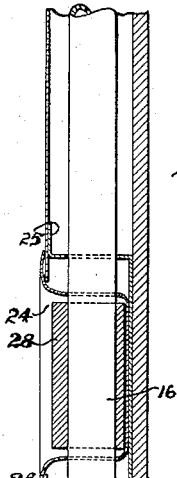
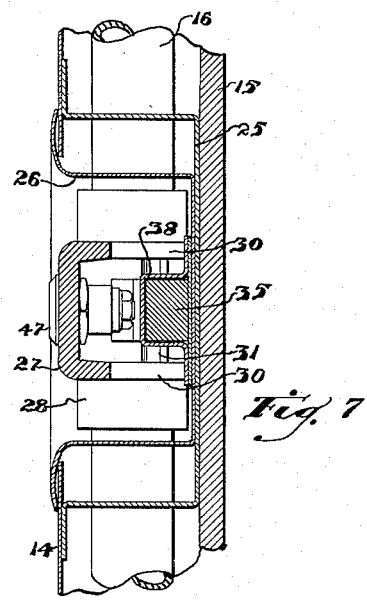
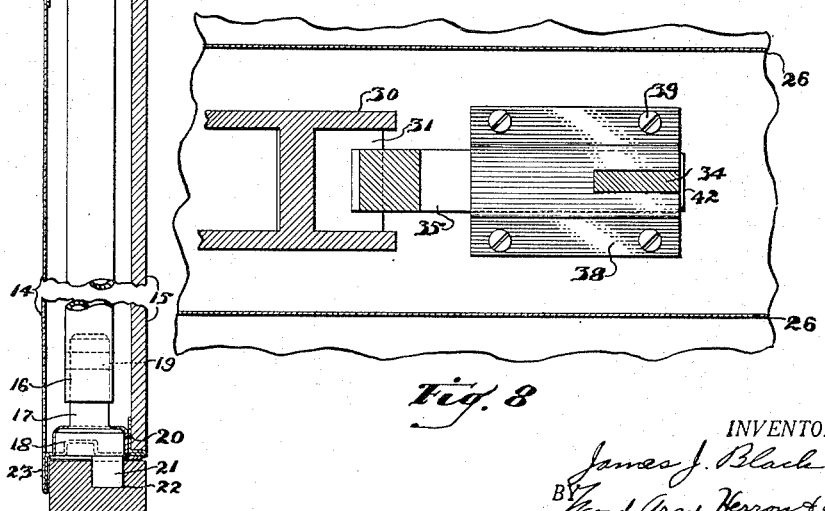
INVENTOR.
James J. Black
BY Wood, Arey, Herron & Evans
Attorneys Patented Apr. 15, 1952

2,592,647

UNITED STATES PATENT OFFICE 2,592,647

LOCKING MECHANISM FOR VEHICLE DOORS

James J. Black, Cincinnati, Ohio, assignor, by mesne assignments, to Trailmobile Inc., a corporation of Delaware Application June 8, 1945, Serial No. 598,365

2 Claims. (Cl. 292—218)

This invention relates to trailers or trucks and it is directed particularly to the construction of the rear doors of the vehicle body, and the locks by which the doors are held in a closed position.

The principal purpose of the invention has been to provide improvements by which the structure of vehicle rear doors is both simplified and rigidified, and to provide a lock capable of holding the rear doors securely in position in a simple reliable manner. The invention also contemplates a lock structure having its parts arranged within the plane of configuration of the door panel. While the door locks in use heretofore have operated satisfactorily, still many of the parts of the assembly projected beyond the body as much as six or eight inches. Theses projections not only formed obstructions which were the cause of accidents but in many cases by virtue of their extension were interferences preventing close positioning of the trailer body to a dock or platform. Moreover, such structures always have been unsightly in appearance, acccumulated dirt and otherwise impaired the pleasing appearance of an otherwise graceful body design.

In accordance with the present invention the rear door, in the form of a panel or the like having spaced walls contains a lock rod which is positioned in the plane of the panel; that it, it is housed between the walls out of sight and out of exposure to road dirt and dust. This rod terminates adjacent opposite edgewise portions of the door where it is equipped with eccentric studs arranged for cooperation with cam slots cut in the door sill and top section of the door frame or cut in the stiles of the door frame if the door is mounted to swing on a horizontal axis. The lock rod has its endwise portions at points adjacent the eccentric studs rotatably journalled in the door frame. These journals are enclosed, and therefore, continue to operate freely under the adverse conditions of highway service.

The lock rod at a central portion thereof, or at a height which is convenient to operate, passes through a recess which is formed in the door panel from the outward face. This recess contains a handle for rotating the lock rod to actuate the cam locks at its ends and also contains a latch for cooperating with the handle to hold it in its locked position. Thus, the handle and the latch are flush with the rear surface of the door panel and offer no projections which interfere with vehicle parking.

A preferred embodiment of the invention is shown in the accompanying drawings which are described in detail in the remainder of the specification.

In the drawings:

Figure 1 represents an end view of a vehicle body with a door locking structure constituting a preferred embodiment of the invention affixed therein in locked position.

Figure 2 is an enlarged view of the recess area as shown in Figure 1.

Figure 3 is a sectional view along the line 3—3, Figure 1, showing the details of construction of the operating mechanism in locked position.

Figure 4 is a view similar to Figure 3 showing the mechanism in partially opened position.

Figure 5 is a sectional view along the line 5—5, Figure 1, particularly illustrating the construction of the locking rod and its associated elements.

Figure 6 is a sectional view along the line 6—6, Figure 5.

Figure 7 is a sectional view along the line 7—7, Figure 3.

Figure 8 is a sectional view along the line 8—8, Figure 3.

In the drawings the doors are indicated generally at 10—10 and are mounted by means of hinges 11 on the frame 12 at the rear end of the vehicle body. As shown, the doors are mounted to swing on a vertical axis and they join one another centrally of the rear opening in the body. One of the doors, for instance the right-hand door, is shown as including a lip 13 which overlaps the surface of the other door when they are in closed position to provide a sill for excluding dirt and dust from the interior of the body. Each door comprises an outer panel 14 suitably arranged upon a marginal frame, and for additional rigidity although not necessarily, each door also comprises an inner panel 15. These may be spaced from one another by the thickness of the marginal frame through which they are joined together.

A lock rod 16 is interposed between the wall panels of one of the doors, i. e., the right-hand door as shown, adjacent the lip joint 13 and parallel thereto. The lock rod may be in the form of a piece of pipe or the like and its ends receive the shanks 17 of lock members 18, the shanks 17 being fastened to the lock rod by means of pins 19.

At the upper and lower edges of the door shown in the drawings cup-shaped recesses 20 are provided which form the journals for the lock pieces 18. In this manner the lock rod is rotatably journalled at its opposite ends in the door panel. Preferably the heads 18 are larger in diameter than the shanks 17 of the locking members and fit relatively snugly in the recesses 20.

Each head 18 has projecting outwardly therefrom an eccentrically positioned stud 21. Each of these studs is positioned for engagement respectively in a cam slot 22. The cam slot at the bottom of the door is located in the sill of the body opening and the cam slot at the top of the door is located in the supper cross piece of the body opening.

If the door is hinged to swing on a horizontal axis then, of course, all of these parts are relatively rotated 90° and the eccentric studs 21 cooperate with slots located in the vertical stiles of the door opening.

It is also to be noted, as shown in Figure 5, that lips 23 extend marginally beyond the edges of the door to provide dust flanges similar to the lip 13 where the doors adjoin one another. These lips or flanges are formed by lateral bending of the sheet material forming the edges of the door and by bending the marginal edgewise portions of the outer door panel 14 around the lateral extensions. This construction supports the door panel 14 and also rigidifies the structure of the lips 23 (see Figure 5). At the inward side of the door the metal forming the door edge is turned back upon itself then flanged downwardly to provide a marginal recess within which the other door panel 15 is located and held in place as by welding. Recess 20 may be formed by swaging the metal of the door edge or by cutting a suitable opening and fastening a cup thereto.

At a convenient level from the ground the lock rod 16 passes through a recess indicated generally at 24. This is formed by cutting an opening in the door panel 14, by bracing the door panel adjacent the opening with the bracket 25 and by disposing a recess cup 26 within the recess. This cup is in the form of a dished member having its marginal edges overlapping the cut-out in the door panel 14 and its back or bottom surface residing adjacent and fastened to the other door panel 15 or the back wall of the support bracket 25. The lateral walls of the recess member 26 are bored to permit the lock rod 16 to extend therethrough.

Within the recess 24 all of the rod operating and locking mechanism for the doors is mounted. This assembly consists generally of a lever 27 having a boss portion 28 thereof bored to embrace the lock rod and fastened thereto by means of pins 29. The lever 27 adjacent the boss is of channel configuration having bottom and top arm portions 30 which are spaced apart from one another and which are interconnected by means of a web 31. The lever 27 extends laterally to a handle 32 adjacent which there is an opening 33 for clearing a latch stud 34.

A web 31 extends across the channel arms 30 at a point near the lock rod and this web forms one part of a latch, the cooperating part of which is furnished by a plunger indicated generally at 35. The leading face of the web 31 is chamfered as at 36; a complementary chamfer 37 is provided at the forward edge of the latch plunger 35. Normally, in the locked position of the lever the latch plunger bears upon a face of the web 31 which is opposite the chamfered surface 36 thereof. Thus, the plunger catches the web and prevents the handle from being swung outwardly. The plunger, however, has a shank portion 34 which is slidable within a U-shaped bracket 38 which is fastened by means of screws 39 to the exposed face of the recess cup 26. The bracket 38 has a slot 40 cut therein through which the stud 34 projects through the opening 33 of the operating lever. Plate 41, which is secured between bracket 38 and door panel 15 has an ear 42 bent upwardly (see Figures 3 and 4). This ear forms a seat for one end of a compression spring 43 housed within a cavity 44 at the bottom face of the latch plunger 35. The other end of the spring 43 bears upon the end of the cavity 44 and thereby urges the plunger 35 into a position within the path of the web 31. The outer extremity of the stud 34 is serrated as at 45 for frictional engagement by the thumb of an operator when his hand grasps the handle portion 32 of the lever. The stud also is bored at 46 to receive the hook of a key lock which would prevent the handle from being swung outwardly whether or not the lever is unlatched.

Another key lock 47 has the barrel 48 thereof received within a bore in the web 31 of the lever. This lock has a finger 49 which is rotatable, upon insertion of a key, into a position behind an abutment 50 on the latch plunger 35. Upon rotation of the finger 49 to a vertical position the finger is disposed to clear the latch plunger 35 and it may be moved away from the web 31 to release the lever. In this manner two separate locks, or a lock and a seal, may be accomplished.

While the web 31 resides in the path of the plunger 35 when the plunger 35 is in extended position, the cam configurated faces 36 and 37 cooperate with one another as the lever 27 is moved from a wide open to a closed position. This causes the plunger 35 to be driven out of the way against the compression spring 43. After the face of the web 31 passes the plunger 35 it snaps into blocking engagement with the web 31 and prevents the lever 27 from being swung outwardly until the plunger 35 is retracted manually as shown in Figure 4.

All the parts of this structure reside within the plane of configuration of the door. There are no projecting parts which may become bent through improper usage or through accident, and no parts to become out of adjustment. Though previous equipment of this type embodying eccentrically operating studs heretofore has been used, it has been the common experience throughout the industry for the operator who has difficulty in opening a door to hammer on the parts and thereby bend them enough to release the door and permit it to be opened. The present apparatus avoids the inconvenience to the operator of jammed doors and also avoids the repair expense which follows mutilation of jammed equipment.

Having described my invention, I claim:

1. In a locking mechanism for fastening a door relative to a door frame, the locking mechanism being adapted to cooperate with an angular keeper slot formed within the door frame, said locking mechanism comprising, a rotatable rod having a radially extended operating handle, a locking head constituting a cylinder having flat inner and outer ends, the locking head being fixed upon an end of the rotatable rod and adapted to be rotated thereby, a locking stud extending from the outer end of the locking head, the locking stud having an axis parallel with the axis of the rotatable rod and spaced radially therefrom to provide a crank motion upon rotation of the locking head, and a journal member for the locking head, the journal member constituting a bottom flange and a cylindrical side wall, the bottom flange engaging the inner end of the locking head to support the locking head and rotatable rod axially, the cylindrical side wall surrounding the locking head and providing a journal supporting the locking head radially, whereby the rotatable rod may be installed within a door with the journal member and locking head residing flush with the edge of the door and with the locking stud extending outwardly in a position to enter the angular keeper slot of a door frame and provide a locking engagement therewith when the locking head is rotated in a locking direction.

2. In a locking mechanism for fastening a door relative to a door frame, the mechanism being adapted to cooperate with a pair of angular keeper slots formed in the door frame, said locking mechanism comprising, a rotatable tube having a radially extended operating handle, respective locking heads on the opposite ends of the rotatable tube, each of said locking heads constituting a cylinder having flat outer and inner ends, each inner end having a shank telescopically engaging an end of the rotatable tube, pins securing the telescopically engaged shanks to the rotatable tube, a locking stud extending from the outer end of each locking head, each locking stud having an axis parallel with the axis of the rotatable tube and spaced therefrom to provide a crank motion upon rotation of the rotatable tube, and a journal member for each locking head, each journal member having a cylindrical wall surrounding the locking head and rotatably supporting the locking head, each journal member having a bottom flange engaging the inner end of the locking head residing therein, the locking heads and rotatable tube being supported axially by said bottom flanges, whereby the rotatable tube may be installed within a door with the journal members and locking heads residing flush with the upper and lower edges of the door and with the locking studs extending outwardly in positions to enter the angular keeper slots of a door frame and provide a locking engagement therewith when the locking heads are rotated in a locking direction.

JAMES J. BLACK.

REFERENCES CITED

The following references are of record in the file of this patent:

UNITED STATES PATENTS

| Number | Name | Date |
|---|---|---|
| 1,760,173 | Schulz | May 27, 1930 |
| 1,917,159 | Schaaf | July 4, 1933 |
| 1,952,112 | Bartsch | Mar. 27, 1934 |
| 1,964,066 | Kuszmaul | June 26, 1934 |
| 1,989,801 | Halinka | Feb. 5, 1935 |
| 1,993,002 | Glaser | Mar. 5, 1935 |
| 2,030,677 | Avels | Feb. 11, 1936 |
| 2,301,444 | Olander | Nov. 10, 1942 |
| 2,380,302 | Geiger | July 10, 1945 |
| 2,505,945 | Dath | May 2, 1950 |